(12) United States Patent
Takatori et al.

(10) Patent No.: US 9,917,663 B2
(45) Date of Patent: Mar. 13, 2018

(54) APPARATUS, SYSTEM, AND METHOD FOR CONFIGURING A SERIALIZER/DESERIALIZER BASED ON EVALUATION OF A PROBE SIGNAL

(71) Applicant: Futurewei Technologies, Inc., Plano, TX (US)

(72) Inventors: Hiroshi Takatori, Sacramento, CA (US); Kevin Zheng, Alhambra, CA (US); Zhan Duan, Milpitas, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/232,689

(22) Filed: Aug. 9, 2016

(65) Prior Publication Data

US 2018/0048401 A1 Feb. 15, 2018

(51) Int. Cl.
H04B 1/38 (2015.01)
H04B 17/21 (2015.01)
H04B 17/11 (2015.01)

(52) U.S. Cl.
CPC ............ *H04B 17/21* (2015.01); *H04B 17/11* (2015.01)

(58) Field of Classification Search
CPC ................................ H04B 17/21; H04B 17/11
See application file for complete search history.

(56) References Cited

U.S. PATENT DOCUMENTS

| | | | | |
|---|---|---|---|---|
| 5,715,277 | A * | 2/1998 | Goodson | H04L 1/0001 370/252 |
| 6,111,949 | A * | 8/2000 | Sheets | H04B 1/586 370/286 |
| 7,613,234 | B2 * | 11/2009 | Raghavan | H04L 5/08 375/219 |
| 7,733,964 | B2 * | 6/2010 | Hsu | H04L 25/03343 375/220 |
| 8,706,042 | B2 | 4/2014 | Takatori | |
| 8,767,521 | B2 * | 7/2014 | Singh | H04M 3/304 370/201 |
| 9,065,644 | B2 | 6/2015 | Takatori | |
| 9,172,498 | B2 | 10/2015 | Takatori et al. | |
| 2002/0176490 | A1 * | 11/2002 | Kamali | H04B 1/7085 375/150 |
| 2003/0099285 | A1 * | 5/2003 | Graziano | H04L 1/0001 375/220 |
| 2005/0074055 | A1 * | 4/2005 | Takatori | H04B 3/32 375/219 |

(Continued)

OTHER PUBLICATIONS

Singh, N. et al., "FIR (Sparse) Filter Design Using IST Algorithm," International Journal of Innovations in engineering and Technology (IJIET), vol. 2, Issue 2, Apr. 2013, pp. 386-394.

(Continued)

*Primary Examiner* — Dac Ha
(74) *Attorney, Agent, or Firm* — Futurewei Technologies, Inc.

(57) ABSTRACT

An apparatus, system, and method are provided for configuring a serializer/deserializer (SerDes) based on evaluation of a probe signal. Included is circuitry configured to detect at least one of a probe signal or a reflection resulting from the probe signal. Such probe signal and/or reflection is evaluated such that at least one configurable aspect of the apparatus may be set, based on the evaluation.

18 Claims, 15 Drawing Sheets

(56) References Cited

U.S. PATENT DOCUMENTS

| | | | | |
|---|---|---|---|---|
| 2005/0100083 A1* | 5/2005 | Takatori | ............. | H04L 12/2854 375/220 |
| 2009/0290622 A1* | 11/2009 | Takatori | ................. | H04B 1/58 375/219 |
| 2012/0281603 A1* | 11/2012 | Takatori | ............... | H04L 7/0037 370/286 |
| 2012/0327818 A1 | 12/2012 | Takatori | | |
| 2015/0249532 A1 | 9/2015 | Takatori | | |

OTHER PUBLICATIONS

Takatori, H., "100G Signaling Options over Backplane Classes," IEEE P802.3bj Jan. 2012 Newport Beach, pp. 1-10.

Mazinni, M. et al., "C2M CDAUI-8: considerations and proposals on P802.3bs 400 Gb/s Ethernet draft," IEEE 302.3bs Task Force, Nov. 9-12, 2015, pp. 1-17, retreived from wwwieee802.org/3/bs/public/15_11/mazzini_3bs_01_1115.pdf.

Frlan, E. et al., "Comment Resolution Worksheet for CEI-56G-XSR-PAM4," Contribution: oif2016.128.04, The Optical Internetworking Forum, 2015, pp. 1-11.

Takatori, H., "56G LR Margin over 40 inch CH," PLL 56G LR Project, oif2014.360.00, Oct. 21, 2014, pp. 1-11.

\* cited by examiner

US 9,917,663 B2

APPARATUS, SYSTEM, AND METHOD FOR CONFIGURING A SERIALIZER/DESERIALIZER BASED ON EVALUATION OF A PROBE SIGNAL

FIELD OF THE INVENTION

The present invention relates to serializer/deserializer systems, and more particularly to configuring the same.

BACKGROUND

A massive data traffic increase has been witnessed recently in data centers which, in turn, has forced interconnect link-speeds from lower speeds (e.g. 10~28 Gbps, etc.) to significantly higher speeds (e.g. 56 Gbps and up, etc.). Based on such demand, a throughput of interconnects [e.g. serializer/deserializer (SerDes), etc.] has been increased by at least a factor of two, and possibly higher.

This, in turn, has resulted in a variety of technical issues. For example, a high speed physical layer device (PHY-IC) is required, and system-level bit error rate (BER) degradation must be addressed. Specifically, since a majority of link channels built using copper printed circuit board (PCB) traces include at least two connectors (especially for backplane applications), the higher speed channel suffers from more loss and crosstalk and, therefore, bit-error performance is degraded.

To address these issues, various solutions have been proposed. One approach involves utilizing PAM4 signaling that enables two bits of information per one symbol, as opposed to one bit per symbol of non-return-to-zero (NRZ) in PAM2 that has been used in the past. Another approach involves using a full-duplex (FD) transmission system that enables bi-directional communications on the same link in both directions simultaneously, or effectively simultaneously.

However, while the use of these and other technologies enable higher link-speed, they typically require more complex, accurate, and sophisticated signal processing.

SUMMARY

An apparatus, system, and method are provided for configuring a serializer/deserializer (SerDes) based on evaluation of a probe signal. Included is circuitry configured to detect at least one of a probe signal or a reflection resulting from the probe signal. Such probe signal and/or reflection is evaluated such that at least one configurable aspect of the apparatus may be set, based on the evaluation.

In a first embodiment, the probe signal may include an alternative isolated pulse (AIP).

In a second embodiment (which may or may not be combined with the first embodiment), an integral of the probe signal may equal zero (0).

In a third embodiment (which may or may not be combined with the first and/or second embodiments), a positive peak amplitude and a negative peak amplitude of the probe signal may have at least one first magnitude that is greater than at least one second magnitude of a positive peak amplitude and a negative peak amplitude of a data signal.

In a fourth embodiment (which may or may not be combined with the first, second, and/or third embodiments), a positive peak amplitude and a negative peak amplitude of the probe signal may be repeated at least twice.

In a fifth embodiment (which may or may not be combined with the first, second, third, and/or fourth embodiments), the at least one configurable aspect of the apparatus may include at least one configurable aspect of a receiver of the apparatus.

In a sixth embodiment (which may or may not be combined with the first, second, third, fourth, and/or fifth embodiments), the at least one configurable aspect of the apparatus may include at least one configurable aspect of a component including a filter, a converter, a decision feedback equalizer (DFE), a feed forward equalizer (FFE), and/or a time recovery component.

In a seventh embodiment (which may or may not be combined with the first, second, third, fourth, fifth, and/or sixth embodiments), the apparatus may include a first SerDes which is part of a system that may further include a second SerDes. In operation, the first SerDes transmits a first probe signal to the second SerDes while a transmitter of the second SerDes is muted. Further, the second SerDes may configure at least one aspect of a receiver of the second SerDes, based on the first probe signal. As an option, the second SerDes may transmit a second probe signal to the first SerDes while a transmitter of the first SerDes is muted. Further, the first SerDes may configure at least one aspect of a receiver of the first SerDes, based on the second probe signal.

As yet another option in connection with the present embodiment, the second SerDes may detect a first reflection that results from the second probe signal. Further, the second SerDes may configure at least one aspect of a component of the second SerDes, based on the detected first reflection. In various embodiments, the aforementioned component may include a filter, a converter, a decision feedback equalizer (DFE), a feed forward equalizer (FFE), and/or a time recovery component. As yet another option, the first SerDes may transmit a third probe signal to the second SerDes while the transmitter of the second SerDes is muted. Further, the first SerDes may detect a second reflection that results from the third probe signal. Still yet, the first SerDes may configure at least one aspect of a component of the first SerDes, based on the detected second reflection.

To this end, in some optional embodiments, one or more of the foregoing features of the aforementioned apparatus, system and/or method may afford a more effective configuration of various SerDes components which, in turn, may deliver more accurate processing of more sophisticated signals. It should be noted that the aforementioned potential advantages are set forth for illustrative purposes only and should not be construed as limiting in any manner.

DETAILED DESCRIPTION

The various embodiments described herein specifically relate to a serializer/deserializer (SerDes) which may refer to any apparatus that includes at least two components, one for converting data from a serial form to a parallel form, and another one for converting data from a parallel form to a serial form. Thus, in various possible applications, such SerDes may compensate for situations where there is a limitation on a number of input/output (I/O) connectors. Specifically, two systems (between which communication is desired) may each be equipped with parallel interfaces and, in such scenario, the aforementioned SerDes's may convert the parallel I/O between such parallel interfaces into a serial format for communication on a serial link which may operate at a higher rate.

To date, there have been limited attempts, if any, to configure a SerDes and the various components thereof, prior to real-time "live" operation. This has, in turn, resulted in subpar performance of the SerDes during real-time operation. This is because the various components of the SerDes have no a priori knowledge of the signaling protocol to be used and, therefore, such different SerDes components may perform differently under different signaling constraints. Thus, various embodiments are described herein for use of a probe signal (and/or any reflections resulting therefrom) to configure, at start-up, such SerDes components, so that performance is improved during real-time operation.

Further, in some optional embodiments, such probe signal may be configured to exhibit certain characteristics that are representative of the signals that are to be expected during real-time operation (per the relevant signaling protocol such as a PAM4 signaling protocol), or any other characteristics that may lead to enhanced configuration. Just by way of example, the probe signal may be configured to: be DC balanced, be repetitive, and/or have a range which is representative of that of expected data signals. Further, in other embodiments to be described, a particular master/slave initialization protocol may be followed by two SerDes's, at start up, such that components of both may be configured for optimized use during real-time operation.

Figure 1A:
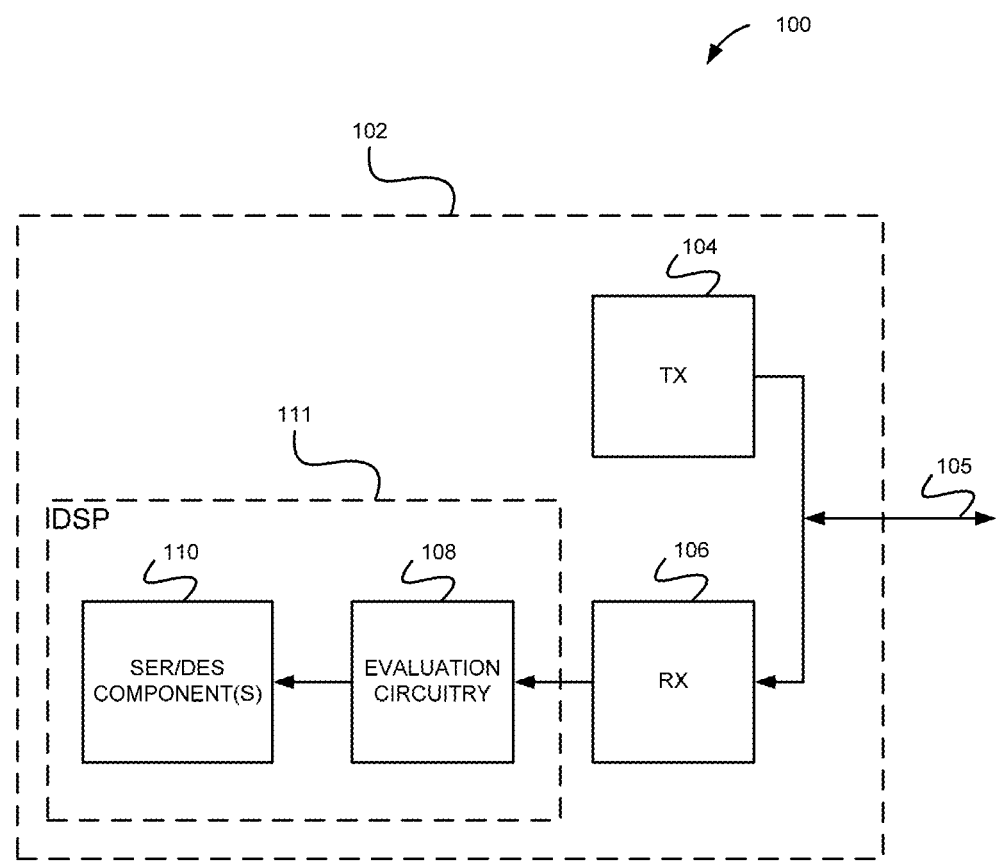
FIG. 1A illustrates a system for configuring a serializer/deserializer (SerDes) based on evaluation of a probe signal, in accordance with one embodiment.

FIG. 1A illustrates a system 100 for configuring a SerDes based on evaluation of a probe signal, in accordance with one embodiment. As shown, the system 100 includes a transmitter 104 and a receiver 106 both in communication with a bi-directional link 105. Further, the receiver 106 is also in communication with evaluation circuitry 108 that, in turn, is in communication with one or more other SerDes components 110.

During use in accordance with one possible embodiment, the transmitter 104 and the receiver 106 may communicate data in the analog domain over the bi-directional link 105, while the remaining components 108, 110 may operate in the digital domain. For example, in one embodiment, the components 108, 110 may be part of at least one digital signal processor (DSP) 111, as shown. Further, while the evaluation circuitry 108 and the one or more other SerDes components 110 are shown to be part of a receive path, it should be noted that such components may be situated in/part of any portion of the system 100 (e.g. interconnected to one or both of the receiver/transmitter paths, etc.).

Prior to use during a start-up/initialization period, the transmitter 104 (or any other transmitter, e.g. a transmitter of another SerDes) may transmit a probe signal. The receiver 106 detects the probe signal and/or a reflection resulting from such probe signal. Such probe signal and/or reflection is then evaluated by the evaluation circuitry 108 so that the resultant evaluated signal may be used by the one or more SerDes components 110 for the purpose of setting at least one aspect thereof. It should be noted that, while shown separately, the evaluation circuitry 108 and the one or more SerDes components 110, in other embodiments, may be the same (i.e. the component doing the evaluating may be the component whose configurable aspect is set, etc.). More information will now be set forth regarding one possible method for implementing the foregoing start-up/initialization period.

Figure 1B:
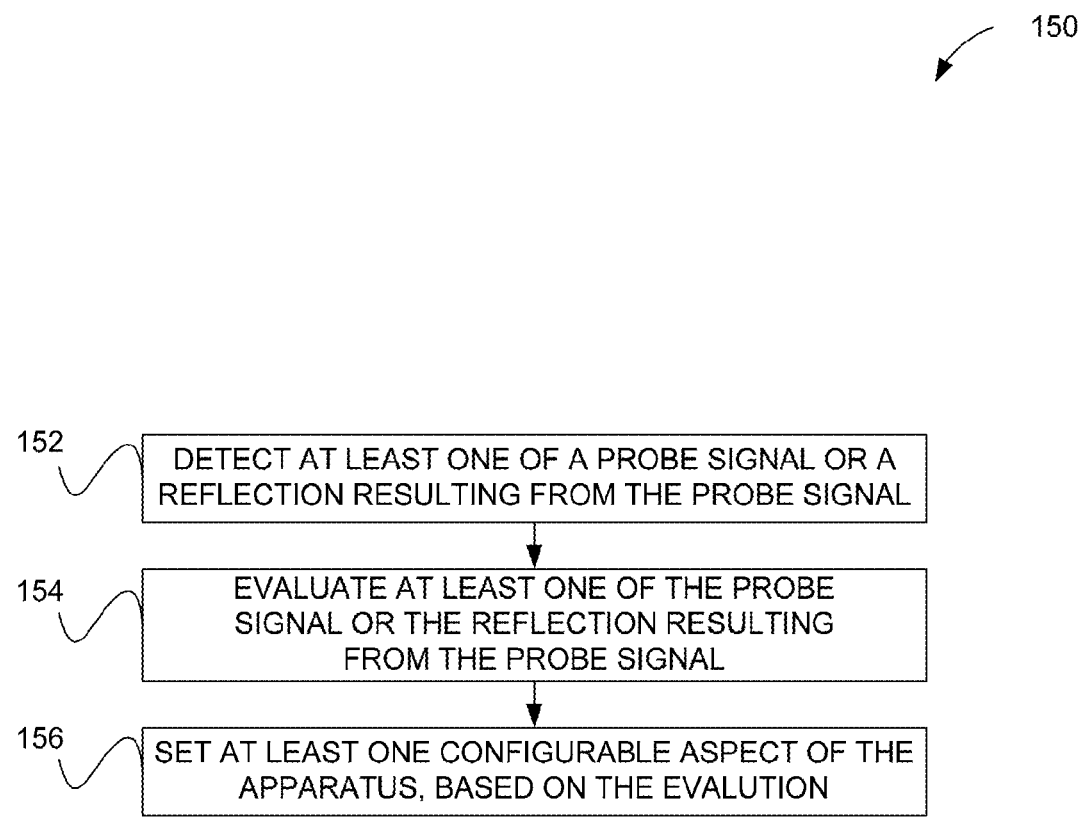
FIG. 1B illustrates a method for configuring a serializer/deserializer (SerDes) based on evaluation of a probe signal, in accordance with one embodiment.

FIG. 1B illustrates a method 150 for configuring a SerDes based on evaluation of a probe signal, in accordance with one embodiment. As an option, the method 150 may be implemented with one or more features of any one or more of the embodiments set forth in any previous and/or subsequent figure(s) and/or description thereof. For example, the method 150 may be implemented in the context of the system 100 of FIG. 1A. However, it is to be appreciated that the method 150 may be implemented in the context of any desired environment.

In the context of the present description, the probe signal may refer to any signal that is capable of being used to evaluate one or more aspects of a system, for configuration purposes. In one possible embodiment, the probe signal may include an alternative isolated pulse (AIP) that includes at least one pulse that has isolated components (e.g. peaks, etc.) that alternate. Still yet, in other embodiments, an integral of the probe signal may equal zero (0). As an option, such feature may allow the probe signal to be direct current (DC) balanced.

In yet another embodiment, a positive peak amplitude and a negative peak amplitude of the probe signal may have at least one first magnitude that is greater than at least one second magnitude of a positive peak amplitude and a negative peak amplitude of a data signal. In other words, one or more of the peak (negative and/or positive) magnitudes of the probe signal may be greater than one or more of the peak (negative and/or positive) magnitudes of the data signal. By this feature, the probe signal may optionally exhibit a range that is at least that of a data signal to be communicated thereafter. To this end, the probe signal may be representative of the data signals that are to be communicated, so that component configuration may reflect the same.

Still yet, a positive peak amplitude and a negative peak amplitude of the probe signal may, in one embodiment, be repeated at least twice. In other embodiments, such alternating feature may be repeated as many times as is desired (e.g. three, four, five or more times, etc.). As will become apparent later, such repetition of the amplitudes may permit the probe signal to more accurately reflect a characterization of run-time data signaling which, in turn, may result in more accurate SerDes component configuration settings. More information regarding one possible probe signal with the foregoing features will be set forth during the description of subsequent embodiments.

As shown, in operation 152, at least one of a probe signal or a reflection resulting from the probe signal is detected. In one embodiment, only the probe signal may be detected, while, in another embodiment, only the reflection is detected. In still other embodiments, both the probe signal and the reflection may be detected. Further, it should be noted that the probe signal and/or reflection may be sourced from the same or different apparatus (or component thereof) that performs one or more of the following operations (e.g. operations 154, 156). For example, the probe signal may be generated by a transmitter (e.g. the transmitter 104 of the system 100 of FIG. 1A or any other transmitter, e.g. a transmitter of another SerDes, etc.).

Further, in the context of the present description, the reflection may include any signal that results from the probe signal. For example, in one embodiment, the reflection may include an echo or leakage signal that is reflected as a result of a transmission of the probe signal. In other optional embodiments, the reflection may include other signals that arise due to the probe signal encountering imperfections in a transmission medium that result in impedance mismatches and/or non-linear changes in transmission medium characteristics. In any case, detection and use of the reflection may provide similar benefits (as compared to use of the probe signal itself), since such reflection represents leakage signals that are expected during run-time operation.

With continuing reference to FIG. 1B, the probe signal and/or the reflection is evaluated in operation 154. In the context of the present description, such evaluation may involve any assessment of the probe signal and/or reflection itself, or any detectable consequence of the same. Further, in various possible embodiments, such evaluation may be performed using evaluation circuitry (e.g. the evaluation circuitry 108 of FIG. 1A, etc.) and/or other relevant circuitry to be described in later embodiments.

For example, in one possible embodiment (to be elaborated upon during the description of FIG. 4B), various samples may be collected based on responses to a probe signal (or reflection thereof), so that coefficients of a particular component [e.g. echo canceller filter, decision feedback equalizer (DFE), etc.] may be set based on such sampling. Further, in another possible embodiment (to be elaborated upon during the description of FIGS. 5-6), an analog waveform reconstruction may be performed with a zooming technique at each sampling phase.

To this end, at least one configurable aspect of the apparatus may be set in operation 156, based on the evaluation. In the present description, the at least one configurable aspect may include any aspect of the apparatus that is capable of being configured either manually and/or automatically. It should be noted that the at least one configurable aspect (and the setting thereof) may involve and be carried out by any desired SerDes component (e.g. the SerDes component(s) 110 of FIG. 1A, etc.). In other embodiments, the at least one configurable aspect of the aforementioned SerDes component may be set by other components (e.g. a separate DSP, the evaluation circuitry 108 of FIG. 1A, etc.).

For example, in one embodiment, the at least one configurable aspect of the apparatus may include at least one configurable aspect of a receiver of the apparatus. In other embodiments, the at least one configurable aspect of the apparatus may include at least one configurable aspect of other components including, but not limited to a filter, a converter, a DFE (e.g. a filter that feeds back detected information, etc.), a feed forward equalizer (FFE) (e.g. a filter that feeds forward detected information, etc.), and/or a time recovery component (e.g. a transmitter/receiver phase interpolator, etc.). In various embodiments, the foregoing components may be part of a DSP. More information regarding such components and the manner in which they may be configured will be set forth later during the description of subsequent embodiments.

To this end, in some optional embodiments, one or more of the foregoing features may afford more effective configuration of various SerDes components, which may deliver more accurate processing of more sophisticated signals. In various optional embodiments, this may be accomplished by configuring the SerDes components using a specifically configured probe signal that is DC balanced, is repetitive, and has a range that is representative of that of expected data signals. It should be noted that the aforementioned potential advantages are set forth for illustrative purposes only and should not be construed as limiting in any manner.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 1C:
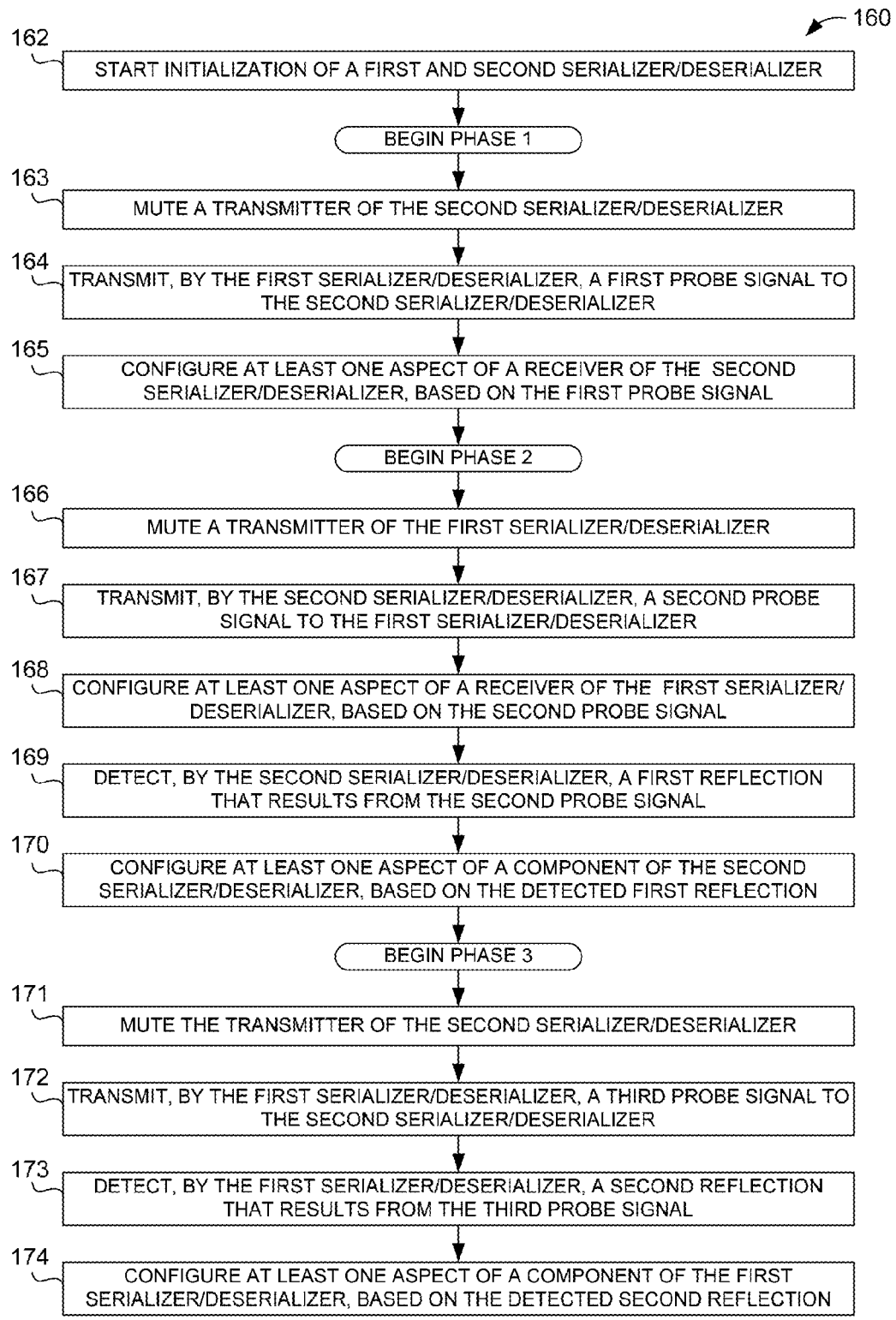
FIG. 1C illustrates a method for configuring two SerDes's in a full duplex system based on evaluation of probe signals, in accordance with one embodiment.

FIG. 1C illustrates a method 160 for configuring two SerDes's in a full duplex system based on evaluation of probe signals, in accordance with one embodiment. As an option, the method 160 may be implemented with one or more features of any one or more of the embodiments set forth in any previous and/or subsequent figure(s) and/or description thereof. However, it is to be appreciated that the method 160 may be implemented in the context of any desired environment.

As shown, the method 160 begins in step 162 with the initiation of an initialization of a first and second SerDes (e.g. the SerDes 102 of FIG. 1A, etc.). Further, a first phase is initiated, that, in step 163, mutes a transmitter of the second SerDes. This may be accomplished, for example, by deactivating or otherwise preventing the transmitter from transmitting any signals, so as to prevent such transmitter from detrimentally affecting any subsequent evaluation. Further, in step 164, the first SerDes transmits a first probe signal to the second SerDes. To this end, in step 165, at least one aspect of a receiver (inclusive of any component thereof) of the second SerDes may be configured, based on the first probe signal. As mentioned earlier, such configuration (and any other configuration mentioned below) may be based on an evaluation of the relevant signal.

Next, in a second phase, a transmitter of the first SerDes is muted in step 166. Further, in step 167, the second SerDes transmits a second probe signal to the first SerDes while the transmitter of the first SerDes is muted. Similar to the first phase, at least one aspect of a receiver of the first SerDes may thus be configured, based on the second probe signal. See step 168. Also, during the current phase, the second SerDes detects a first reflection that results from the second probe signal in step 169. Further, in step 170, at least one aspect of a component of the second SerDes may be configured, based on the detected first reflection.

Moving on to a third phase of the initialization, the transmitter of the second SerDes is again muted in step 171, and the first SerDes transmits a third probe signal to the second SerDes in step 172. Further, the first SerDes detects, in step 173, a second reflection that results from the third probe signal. To this end, at least one aspect of a component of the first SerDes may be configured, based on the detected second reflection, per step 174. An example of a specific implementation of the method 160 of FIG. 1C will now be set forth.

Figure 2A:
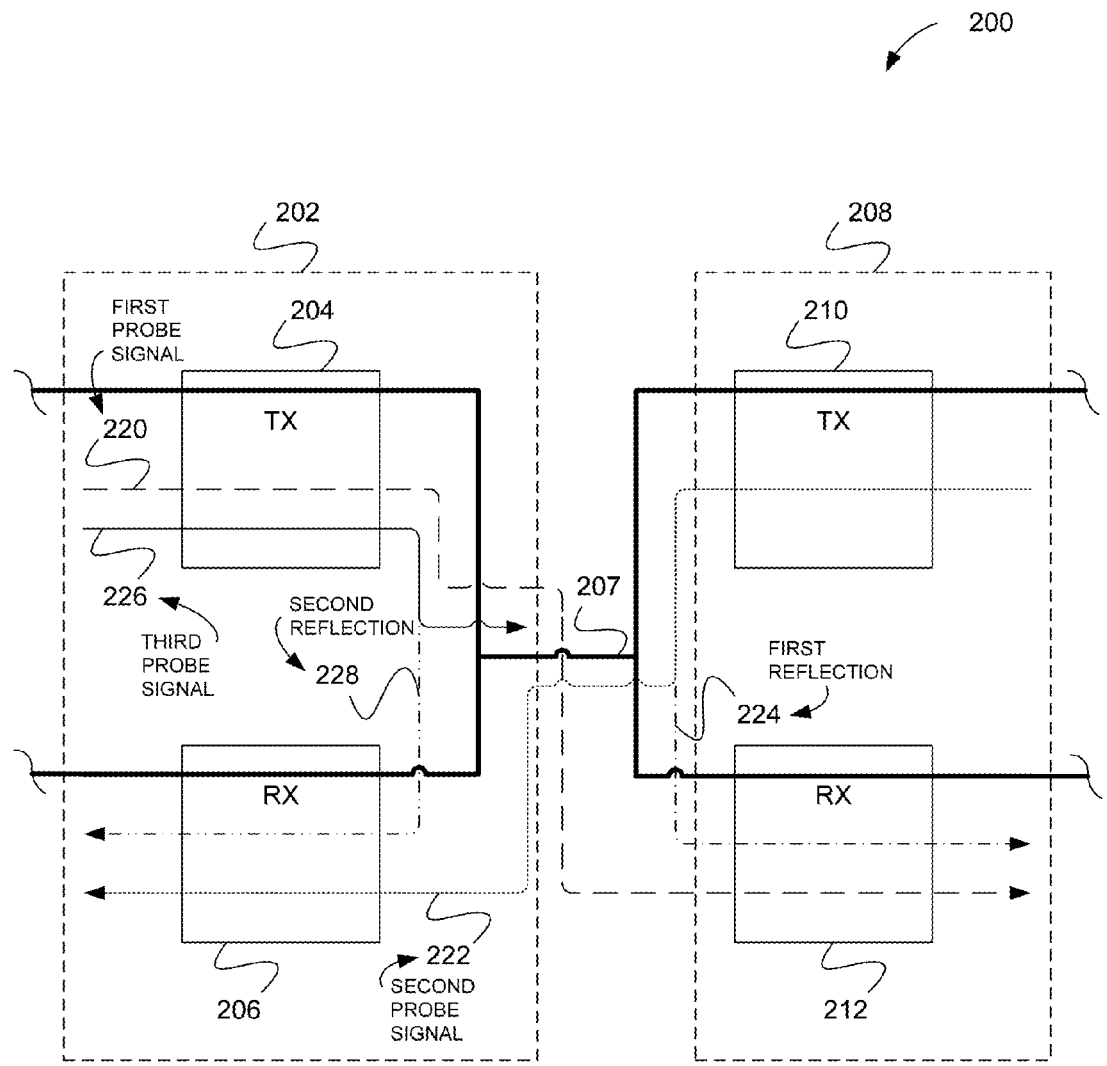
FIG. 2A illustrates a full duplex system for configuring two SerDes's based on evaluation of probe signals, in accordance with one embodiment.

FIG. 2A illustrates a full duplex system 200 for configuring two SerDes's based on evaluation of a probe signal, in accordance with one embodiment. As an option, the system 200 may be implemented with one or more features of any one or more of the embodiments set forth in any previous and/or subsequent figure(s) and/or description thereof. For example, the configuration of the full duplex system 200 may be accomplished by way of the use of the method 160 of FIG. 1C. However, it is to be appreciated that the system 200 may be implemented in the context of any desired environment.

As shown, the full duplex system 200 includes a first SerDes 202 that includes a transmitter 204 and a receiver 206 that communicate signals over a transmission medium 207 (e.g. cable, optical fiber, etc.). Further, the full duplex system 200 also includes a second SerDes 208 that includes a transmitter 210 and a receiver 212 that communicate signals over the transmission medium 207. In operation, the first SerDes 202 and the second SerDes 208 cooperate with a probe signaling protocol that allows for various components thereof to be optimally configured for subsequent data communication. In one possible embodiment, the first SerDes 202 may operate as a master, and the second SerDes 208 may operate as a slave.

Specifically, the first SerDes 202 transmits a first probe signal 220 (using the transmitter 204, as shown) to the second SerDes 208 while the transmitter 210 of the second SerDes 208 is muted, where such muting may be timed to coincide with the first probe signal 220 in accordance with a predetermined start-up/initialization period. In various embodiments, the transmitter 210 of the second SerDes 208 may be muted by any desired mechanism that ensures that the transmitter 210 does not transmit any signal (or zero power or substantially zero power). Further, a timing of such muting (and any other signaling described hereinbelow) may be accomplished by configuring both the first SerDes 202 and the second SerDes 208 to follow a specific protocol that involves specific signaling (or lack thereof) during specific time periods, etc. By this design, the second SerDes 208 may configure at least one aspect of the receiver 212 of the second SerDes 208, based on the first probe signal 220. In various optional embodiments, the at least one aspect of the receiver 212 may include, but is not limited to a receiver sampling process, and/or a timing recovery component (e.g. phase interpolator, etc.) associated with the receiver.

Thereafter, the second SerDes 208 may transmit a second probe signal 222 to the first SerDes 202 while the transmitter 204 of the first SerDes 202 is muted. As an option, a phase of the second probe signal 222 may be offset (e.g. arbitrarily or otherwise, etc.) with respect to the first probe signal 220. Further, in another embodiment, the phase offset may be set in accordance with the disclosure in U.S. Pat. No. 8,706,042, entitled "TRANSMIT PHASE CONTROL FOR THE ECHO CANCEL BASED FULL DUPLEX TRANSMITTION SYSTEM," which is incorporated herein by reference. Thus, the first SerDes 202 may configure at least one aspect of the receiver 206 of the first SerDes 202, based on the second probe signal 222. Such at least one aspect of the receiver 206 of the first SerDes 202 may or may not be the same as that which is configured for the receiver 212 of the second SerDes 208, based on the first probe signal 220.

As yet another option, the second SerDes 208 may detect a first reflection 224 that results from the second probe signal 222. Further, the second SerDes 208 may configure at least one aspect of a component of the second SerDes 208, based on the detected first reflection 224. In various embodiments, the aforementioned component may include a filter, a converter, a DFE, a FFE, and/or a time recovery component. For example, in one embodiment, coefficients of a finite impulse response (FIR) filter of an echo canceller may be set based on the detected first reflection 224, for optimizing subsequent cancellation of signal reflections (e.g. echo, etc.). As mentioned earlier, such coefficients may be set by a separate DSP, or any other circuit for that matter (e.g. the evaluation circuitry 108 of FIG. 1A, etc.). More information regarding such components will be set forth later during the description of subsequent embodiments.

As yet another option, the first SerDes 202 may transmit a third probe signal 226 to the second SerDes 208 while the transmitter 210 of the second SerDes 208 is muted. Further, the first SerDes 202 may detect a second reflection 228 that results from the third probe signal 226. Still yet, the first SerDes 202 may configure at least one aspect of a component of the first SerDes 202, based on the detected second reflection 228. In various embodiments, such configured component of the first SerDes 202 may or may not be the same as that which is configured for the second SerDes 208, based on the detected first reflection 224.

By this protocol, the transmission of the first probe signal 220 and the second probe signal 222 may be used by the second SerDes 208 and the first SerDes 202, respectively, for configuring the respective receivers 212, 206. Still yet, the first reflection 224 and the second reflection 228 may be used by the second SerDes 208 and the first SerDes 202, respectively, for configuring the respective components thereof. As mentioned earlier, detection and use of such reflections 224, 228 may provide similar benefits (as compared to use of the probe signals 220, 222, 226), since such reflections 224, 228 represent leakage signals that are expected during run-time operation. Thus, the components may be configured to reduce any negative ramifications of such leakage, etc.

More information will be set forth later during reference to FIG. 3 regarding an exemplary probe signal that may or may not be used as the first probe signal 220, the second probe signal 222, and/or the third probe signal 226, for enhancing an effectiveness with which the various components of the first SerDes 202 and/or the second SerDes 208 may be configured.

Figure 2B:
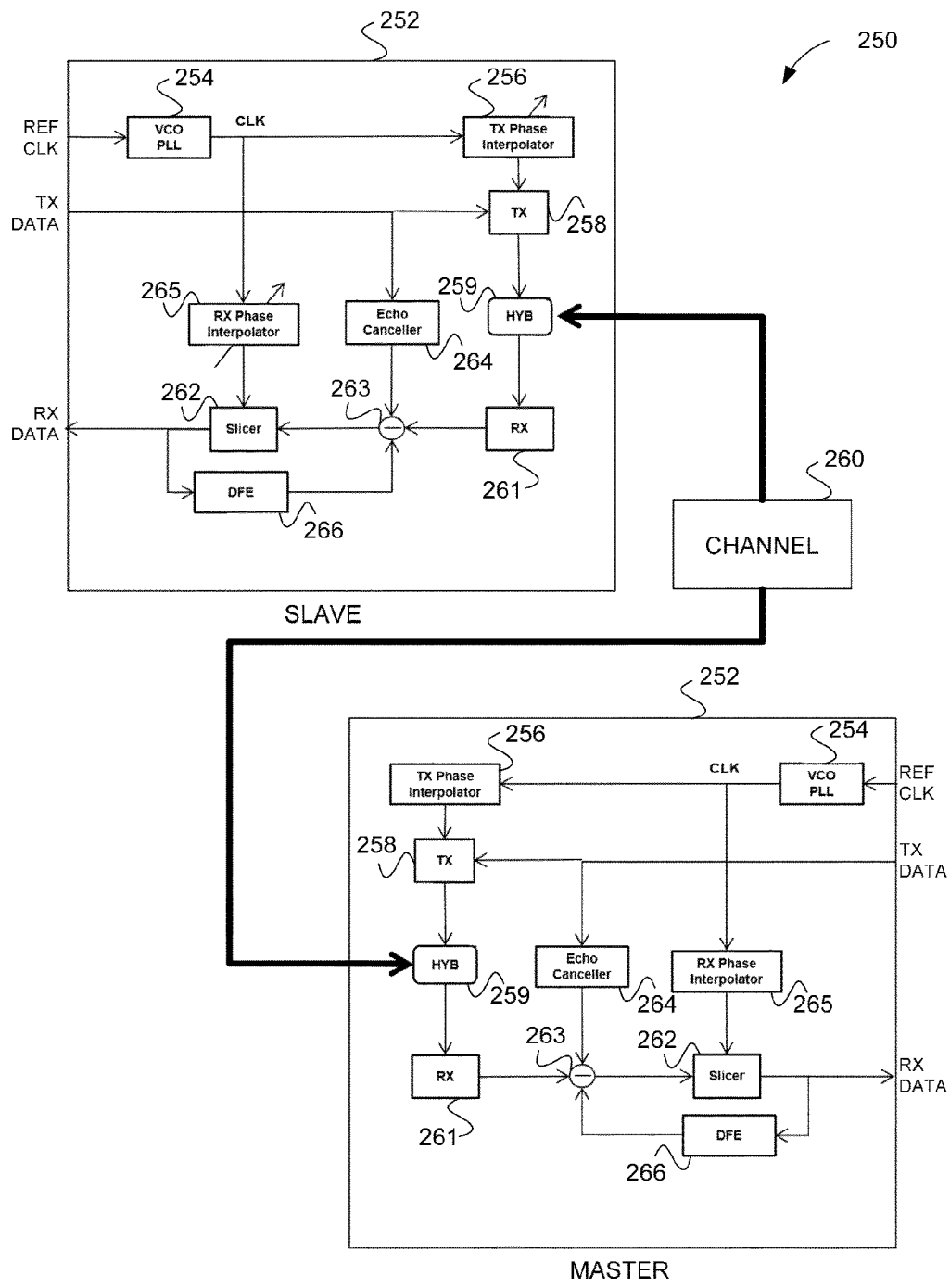
FIG. 2B illustrates another full duplex system for configuring a SerDes based on evaluation of a probe signal, in accordance with another embodiment.

FIG. 2B illustrates another full duplex system 250 for configuring a SerDes based on evaluation of a probe signal, in accordance with one embodiment. As an option, the system 250 may be implemented with one or more features of any one or more of the embodiments set forth in any previous and/or subsequent figure(s) and/or description thereof. However, it is to be appreciated that the system 250 may be implemented in the context of any desired environment.

As shown, the full duplex system 250 includes a pair of SerDes's 252 that each include a voltage controlled oscillator (VCO) phase locked loop (PLL) circuit 254 for clocking purposes (and synchronizing the SerDes's 252). Also included is a time recovery component in the form of a transmitter phase interpolator 256 in communication with the VCO/PLL circuit 254 and a transmitter 258 for transmitting signals over a channel 260 via a first-order echo canceller (HYB) 259 for cancelling at least a portion of an echo.

Further included is a receiver 261 for receiving signals and feeding the same to a slicer 262 for determining whether an incoming signal is a "1" or a "0." Also included is an echo mitigation element 263 in the form of a subtractor/adder (under the control of an echo canceller 264) that serves to remove any signal reflection (e.g. echo, etc.) output from the receiver 261 before being received by the slicer 262. Still yet, another time recovery component in the form of a receiver phase interpolator 265 controls the slicer 262 for ensuring that a timing of the slicer 262 adheres to the timing of the VCO/PLL circuit 254, for proper operation. Specifically, if the timing of the slicer 262 fails to adhere to the timing of the VCO/PLL circuit 254, the slicer 262 may not be able to readily distinguish between pulses of different magnitudes due to timing offsets. Even still, each SerDes 252 includes a DFE 266 that provides feedback to the echo mitigation element 263 so that any signal reflection (e.g. echo, etc.) may be removed.

Figure 2C:
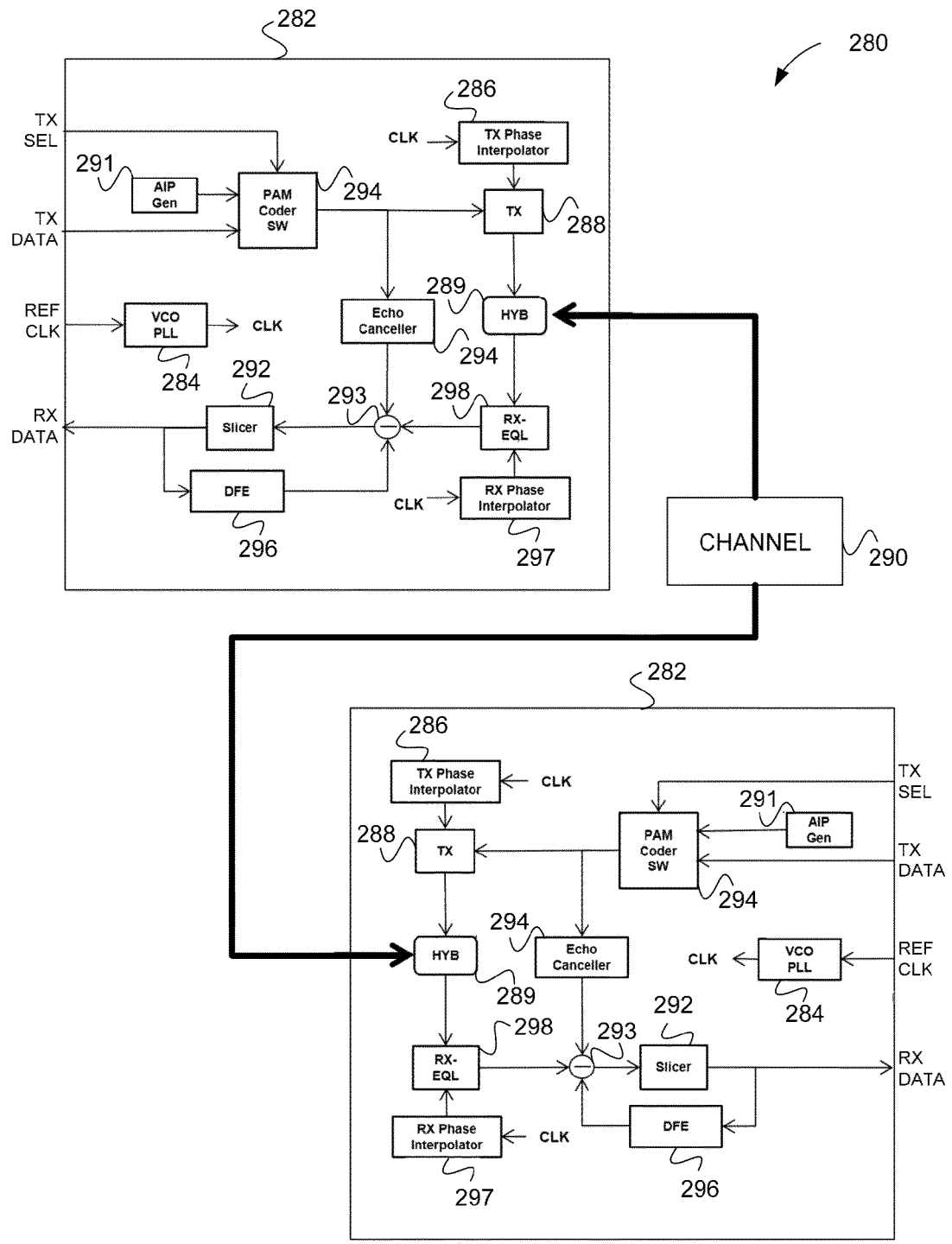
FIG. 2C illustrates yet another full duplex system for configuring a SerDes based on evaluation of a probe signal, in accordance with yet another embodiment.

FIG. 2C illustrates yet another full duplex system 280 for configuring a SerDes based on evaluation of a probe signal, in accordance with one embodiment. As an option, the system 280 may be implemented with one or more features of any one or more of the embodiments set forth in any previous and/or subsequent figure(s) and/or description thereof. However, it is to be appreciated that the system 280 may be implemented in the context of any desired environment.

Similar to the full duplex system 250 of FIG. 2B, the full duplex system 280 includes a pair of SerDes's 282 that each include a voltage controlled oscillator (VCO) phase locked loop (PLL) circuit 284 for clocking purposes (and synchronizing the SerDes's 282). Also included is a time recovery component in the form of a transmitter phase interpolator 286 in communication with a transmitter 288 for transmitting signals over a channel 290 via a first-order echo canceller (HYB) 289 for cancelling at least a portion of an echo. Further included is a slicer 292 for determining whether an incoming signal is a "1" or a "0," and an echo mitigation element 263 (under the control of an echo canceller 294) that serves to remove any signal reflection (e.g. echo, etc.) from a signal before feeding the same to the slicer 292. Even still, each SerDes 282 includes a DFE 296 that provides feedback to the echo mitigation element 293 so that any signal reflection (e.g. echo, etc.) may be removed in an optimized manner.

In contrast to the full duplex system 250 of FIG. 2B, the full duplex system 280 includes an AIP generator 291 that serves to generate an AIP signal for input (along with data) to a PAM coder switch 294 that, in turn, feeds the transmitter 288, for transmitting the same. Further, a time recovery component in the form of a receiver phase interpolator 297 controls a receiver equalizer 298 that processes incoming signals to condition the same for further subsequent processing by the echo mitigation element 293, slicer 292, etc.

In both the full duplex system 250 of FIG. 2B and the full duplex system 280 of FIG. 2C, the echo canceller 264, 294 regenerates a local echo leakage signal (from the local transmitter 258, 288 to the local receiver components 261, 298) and subtracts the same from an incoming signal by the echo mitigation element 263, 293. The leakage signal from the local transmitter 258, 288 may include reflections from the any impedance mismatch in the channel 260, 290. Therefore, a probe signal is desired that has a longer cycle period than any delay of such reflections, so that various components of the full duplex systems 250, 280 may be properly calibrated.

In one embodiment, the echo canceller 264, 294 may include an adaptive finite pulse response (FIR) filter with coefficient values that may be adapted based on a correlation between an output of the DFE 266, 296 (e.g. an ERROR signal, etc.) and an input of the local transmitter 258, 288. Various complications may arise from use of the aforementioned ERROR signal. Specifically, if the echo is larger than a far-end signal (e.g. in case of digital subscriber line (DSL), it is 20 dB larger than the far-end signal), adaptation of the echo canceller 264, 294 may be particularly difficult. More information will now be set forth regarding an exemplary probe signal that may be used to calibrate one or more of the foregoing components to address such potential problem, in the context of one optional embodiment.

Figure 3:
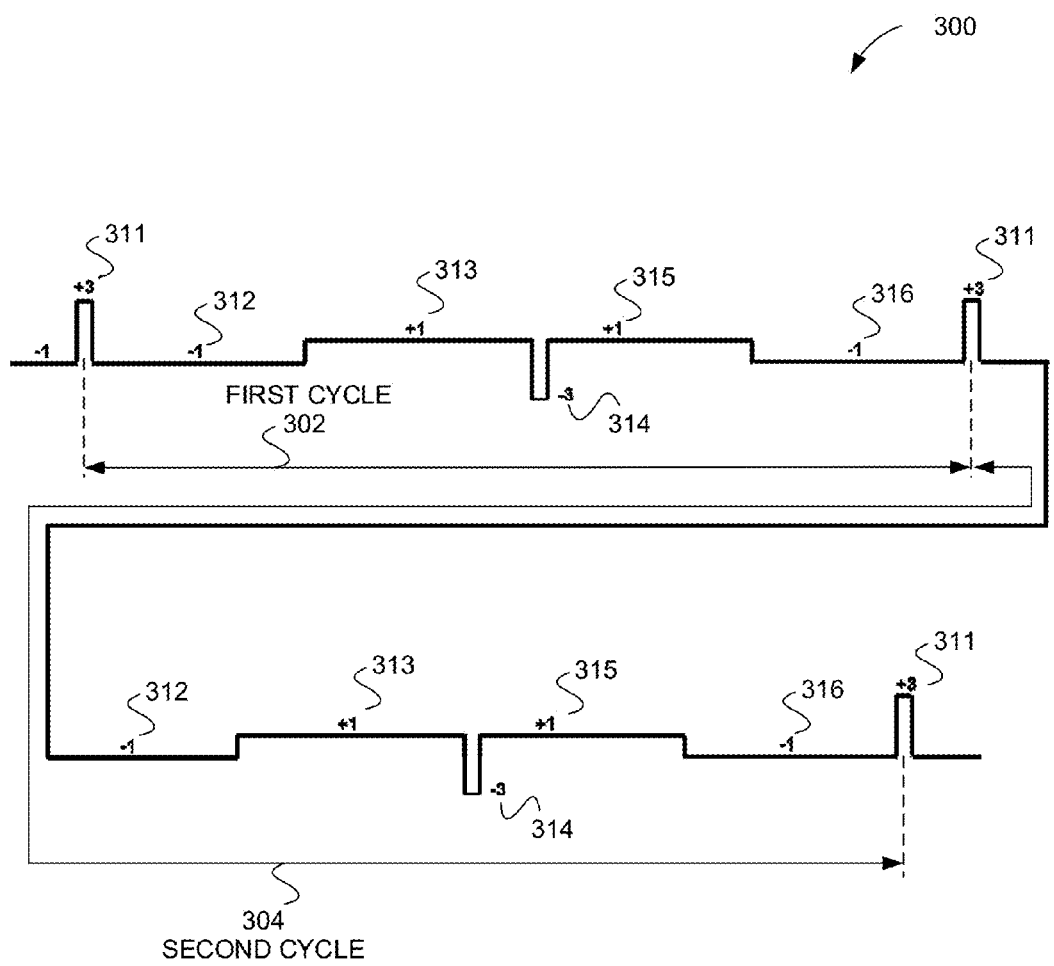
FIG. 3 illustrates an exemplary probe signal for use in configuring various components of a SerDes, in accordance with one embodiment.

FIG. 3 illustrates an exemplary probe signal 300 for use in configuring various components of a SerDes, in accordance with one embodiment. As an option, the probe signal 300 may be used in the context of any one or more of the embodiments set forth in any previous and/or subsequent figure(s) and/or description thereof. However, it is to be appreciated that the probe signal 300 may be used in the context of any desired environment.

As shown, the probe signal 300 is repetitive in that a first cycle 302 and a second cycle 304 of the probe signal 300 are identical. In other embodiments, the first cycle 302 and the second cycle 304 may differ in various respects. Further, an area between the positive pulses (and zero) and an area between the negative pulses (and zero) may be equal to ensure that the probe signal 300 is DC-balanced.

Still yet, as an option, the probe signal 300 may be specifically tailored to reflect a specific modulation scheme used by the SerDes. For example, in one possible embodiment, the probe signal 300 may be configured to reflect a PAM4 signaling scheme that enables two bits of information per one symbol. Specifically, the probe signal 300 may include the pulses outlined in Table 1 below.

TABLE #1 one symbol of +3 PAM (311) at a beginning of a cycle
one symbol of −3 PAM (314) at the middle of the cycle
consecutive N/2-1 symbols of −1 PAM (312) after the first +3 PAM symbol followed by N/2 symbols of +1 PAM (313)
consecutive N/2-1 symbols of +1 PAM (315) after the middle of −3 PAM symbol followed by N/2 symbols of −1 PAM (316)

In one embodiment, one cycle may be 2048 symbols in length, however, other lengths and modulation schemes are contemplated.

In the case of PAM4 signaling, inter-symbol interference (ISI) may cause erroneous decision-making (e.g. in connection with the aforementioned ERROR signal from the DFE 266, 296 of FIGS. 2B/2C, etc.). Thus, error propagation from a DFE can pose a problem for SerDes adaptation. Since a PAM4 signal modulation scheme (e.g. +3, +1, −1, and −3) does not have a zero (0) value symbol, it is not possible to evaluate a single pulse, however, the probe signal 300 may provide a solution, in some embodiments. Specifically, this solution may be afforded by transmitting the single +3 or −3 symbol (311, 314) injected with the consecutive −1 or +1 symbols (312, 315). By this design, the probe signal 300 may behave as an isolated PAM symbols with alternating polarity. Further, the amplitude of a PAM symbol is 33% higher than a normal +3 PAM symbol, which corresponds to +4 PAM symbol.

Figure 4A:
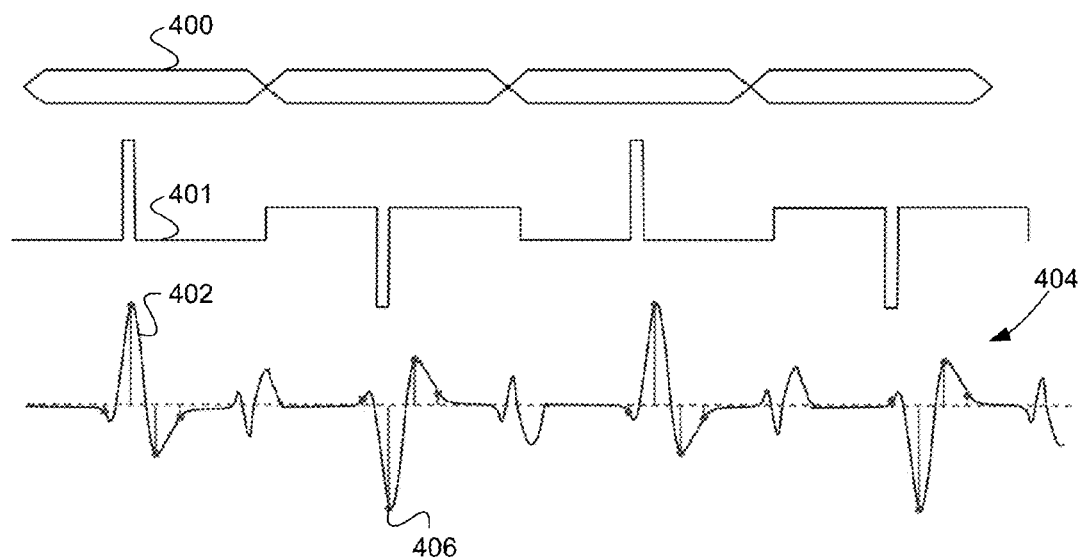
FIG. 4A shows a plot of an exemplary probe signal and a response to such probe signal at a receiver, in accordance with one embodiment.

FIG. 4A shows a plot of an exemplary probe signal and a response to such probe signal at a receiver, in accordance with one embodiment. Specifically, the probe signal (which may be represented by either signal 400 or signal 401) may be sent from a far-end transmitter (e.g. transmitter 210 of FIG. 2A, etc.), pass through a channel and, then, fed to a near-end receiver (e.g. receiver 206 of FIG. 2A, etc.). Since the channel may include a DC decouple capacitor, a tail of a +3 portion 402 of a probe signal response 404 converges to zero voltage before the pattern changes from −1 to +1. Further, a transient from −1 to +1 also diminishes when a −3 portion 406 of the probe signal response 404 appears. This means that the probe signal 400, 401 generates the isolated single pulse response of a PAM signal and unit response of the channel.

Figure 4B:
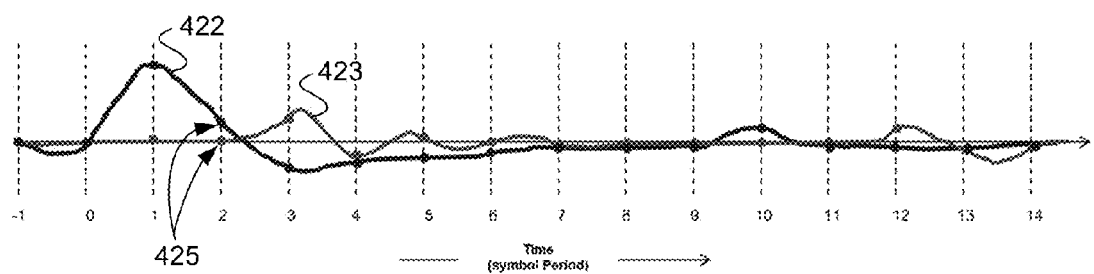
FIG. 4B shows another plot of probe signal responses, in accordance with one embodiment.

FIG. 4B shows another plot of probe signal responses 422, 423, in accordance with one embodiment. A first response 422 is a response from a far-end transmitter (e.g. transmitter 210 of FIG. 2A, etc.), and a second response 423 is a response from a local transmitter (e.g. transmitter 204 of FIG. 2A, etc.). The various dots 425 represent a sampling phase of both responses 422, 423. The sampled values represented by the dots 425 corresponding with an echo from the local transmitter and signal from the far-end transmitter. Based on this evaluation (e.g. sampling, etc.), these values may be loaded as initial coefficients for a filter of an echo canceller (e.g. a filter of the echo canceller 264, 294 of FIGS. 2B/2C, etc.) and/or a DFE (e.g. the DFE 266, 296 of FIGS. 2B/2C, etc.). Once such coefficient values are set for such component(s), a signal pattern may be changed from the probe signal to a data signal [e.g. pseudo-random bit stream (PRBS) signal, etc.].

Figure 5:
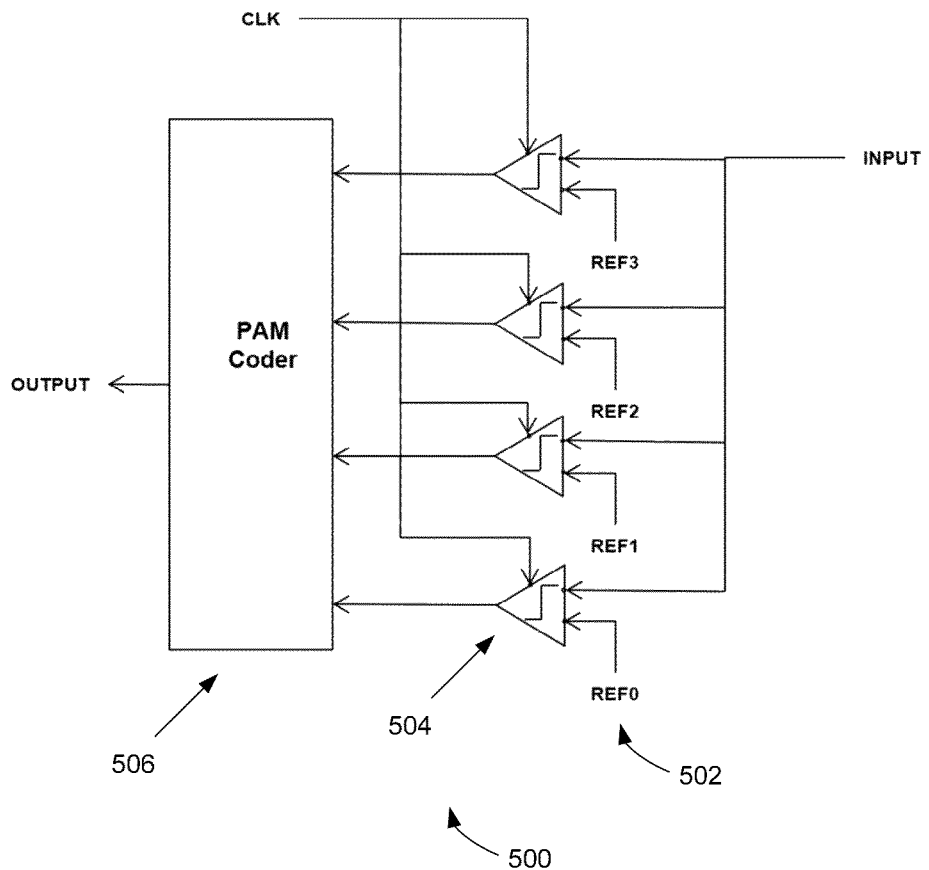
FIG. 5 is a block diagram of an exemplary slicer circuit, in accordance with one embodiment.

FIG. 5 is a block diagram of an exemplary slicer circuit 500, in accordance with one embodiment. As an option, the slicer circuit 500 may be implemented in the context of the slicer 262 of FIG. 2B and/or the slicer 292 of FIG. 2C. Once an appropriate sampling phase is acquired, the slicer circuit 500 may be used to quantize the input pulse response, as shown. In one embodiment, the references to the slicer circuit 500 may be independently tunable with a wide range, using a plurality of reference signals 502 that feed a plurality of comparators 504 which, in turn, feed a 2-bit output PAM decoder 506, as shown. Such reference signals 502 may, in one embodiment, be as follows: REF0=0, REF1=−100 mV, and REF2=+100 mV, REF3=150 mV (for error detection), to accommodate different amplitudes of expected PAM signaling. Table #2 below shows output of the PAM decoder 506 as a function of different input.

TABLE #2

| Input | PAM | COMP0 | COMP1 | COMP2 | Decoder OUTPUT (2 bit) |
|---|---|---|---|---|---|
| A | +3 | +1 | +1 | +1 | (1, 1) for PAM = 3 |
| B | +1 | +1 | +1 | −1 | (1, 0) for PAM = 1 |
| C | −1 | +1 | −1 | −1 | (0, 1) for PAM = −1 |
| D | −3 | −1 | −1 | −1 | (0, 0) for PAM = −3 |

Figure 6:
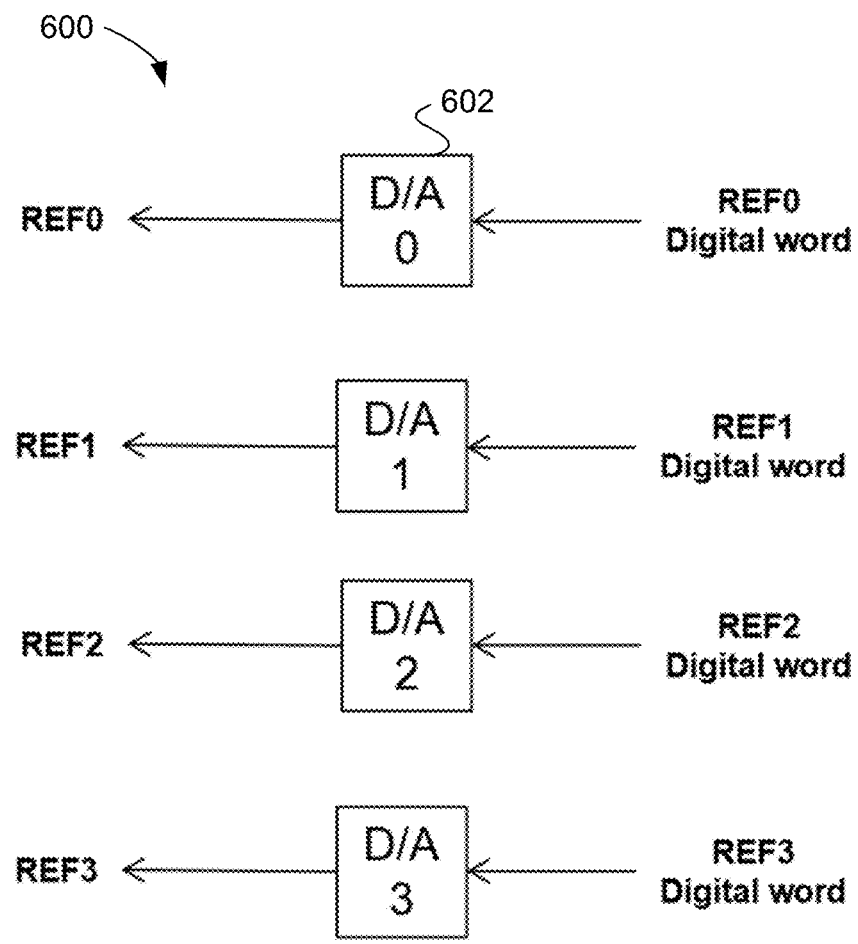
FIG. 6 is a block diagram of a circuit for generating reference signals for use by the slicer of FIG. 5, in accordance with one embodiment.

FIG. 6 is a block diagram of a circuit 600 for generating reference signals for use by the slicer 500 of FIG. 5, in accordance with one embodiment. As shown, a plurality of digital-to-analog converter (ADC) reference generators 602 may be used for such purpose. Further, a quantization accuracy may be determined by a least significant bit (LSB) size of the reference generators 602.

With reference again to FIG. 5, four (4) slicers of the slicer circuit 500 may be used as a 2.3 bit ADC. A higher resolution may be achieved using a zooming technique. Specifically, the references of the slicers of the slicer circuit 500 may be set to cover a full scale range of signaling that is expected during run-time operation. By such design, an output describes the coarse input value, and the reference levels may be readjusted to zoom into the output code range so that the slicer circuit 500 may operate more effectively in the expected signaling range during run-time operation, and thus more accurately discern between pulses of different magnitudes, during use. Effectively, a zoom ratio of five (5) may be achieved for each adjustment step of the aforementioned zooming technique. Further, the above step may be repeated until a desired accuracy is reached, under the control of a separate DSP, or any other circuitry (e.g. the evaluation circuitry 108 of FIG. 1A, etc.).

Thereafter, the sampled pulse analog value may be back-calculated given the output code at each step. In addition, averaging over multiple samples may reduce noise and lead to a more accurate result. Using an independent phase interpolator of each DFE plane, a phase sweep on the probe signal response may be obtained. Further, a complete analog waveform reconstruction may be performed with the zooming ADC technique described above at each sampling phase. Once the foregoing evaluation is complete and reconstructed waveforms are obtained, initial parameters and coefficients may be set for various blocks in the system. In various embodiments, the same method can be applied again whenever there is a parameter change, such as the equalization strength of the receiver analog front end (AFE).

Once both the far-end signal and near-end echo is synthesized in connection with the evaluation of the probe signal/reflection, they may be used as initial coefficient values for a EC-FIR and DFE. Also, the RX phase interpolator may be adjusted so that the inter-symbol interference (ISI) may be minimized in combination with the RX-EQL. As mentioned earlier, the foregoing techniques for setting the relative components may be carried out during the startup/initialization period based on evaluation of a probe signal (or relevant reflection) to improve operation of the relevant SerDes component(s) during run-time operation.

Figure 7A:
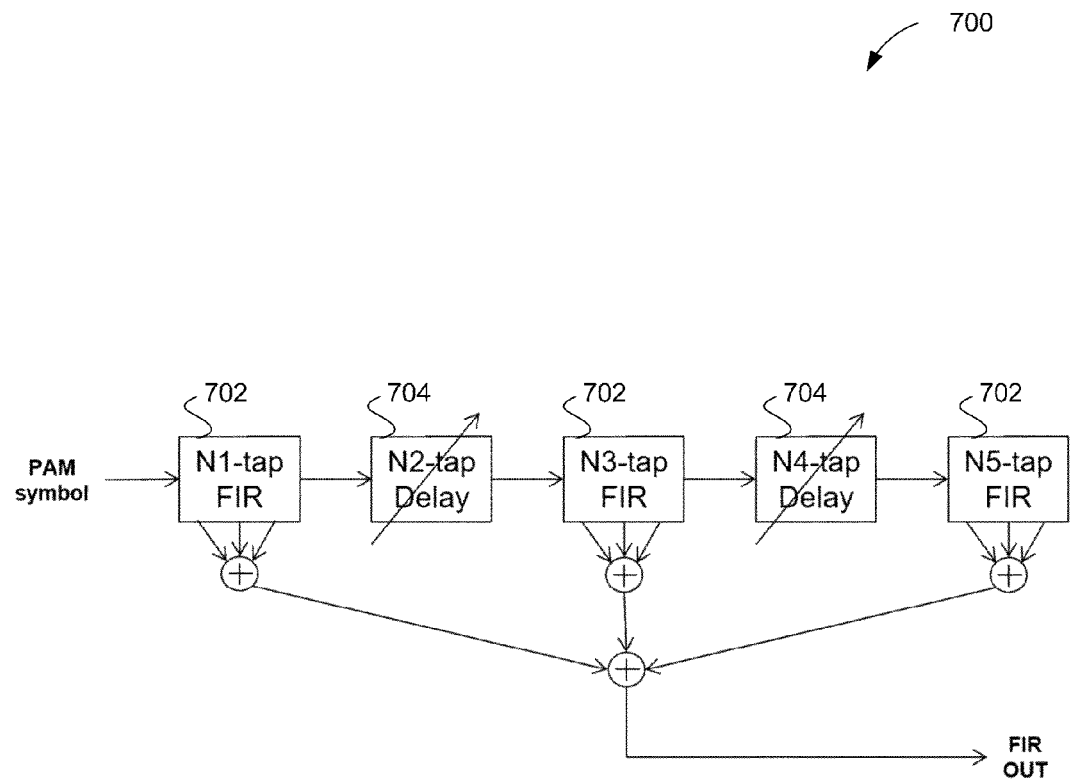
FIG. 7A shows a sample slider-type FIR filter circuit with multiple tap blocks and configurable delays, in accordance with one embodiment.

Another possible benefit of using the probe signal for calibration at start-up may include an ability to quickly identify the position and length of a slider type FIR filter. FIG. 7A shows a sample slider-type FIR filter circuit 700 with multiple tap blocks 702 and configurable delays 704, in accordance with one embodiment. In some embodiments, it may be a time consuming and complicated process to identify the position and length of the slider-type FIR filter circuit 700 when more than several blocks 702 are assigned for the slider FIR. Although the slider-type FIR filter circuit 700 is shown to include five (5) tap blocks 702, in fact, it may require over twenty (20) blocks for the case of an EC-FIR where multiple echo reflections exist in a real system that is capable of high speeds (e.g. 56 Gbps, etc.). This may represent a tradeoff between performance and power consumption, in different embodiments. Since a single pulse time-domain analysis-type evaluation is enabled by a probe signal-based start-up, optimal numbers of N1 to N5 in FIG. 7A (which represents an effective tap-length of the FIR filter circuit 700) and slider positions may be determined without an exhausted search of multi-dimensions of a signal-to-noise (SNR) evaluation, which may take a very long time (which, in turn, reduces complexity and total power consumption of the system).

Figure 7B:
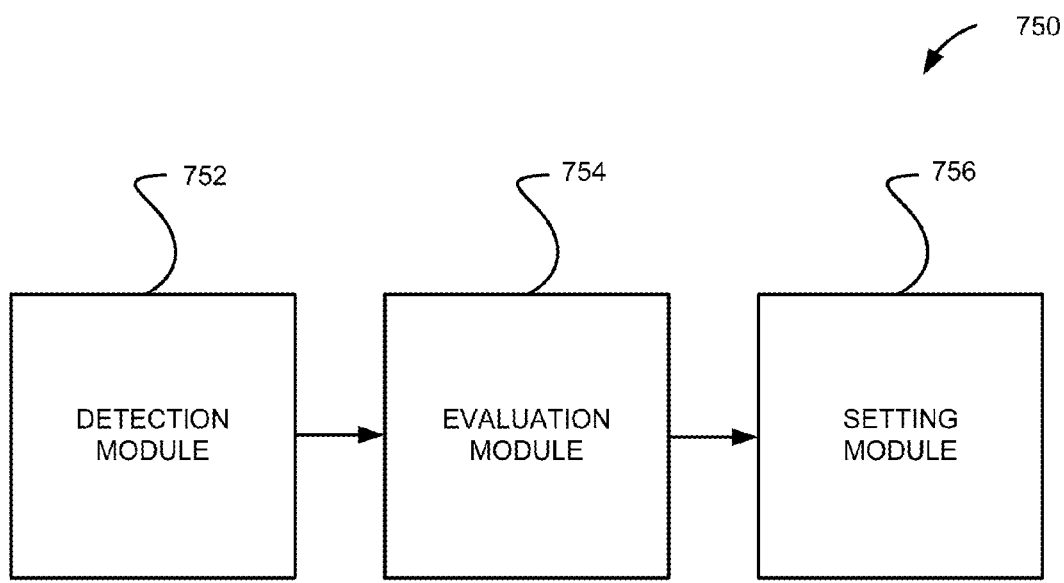
FIG. 7B illustrates a system for configuring a SerDes based on evaluation of a probe signal (and/or a reflection thereof), in accordance with one embodiment.

FIG. 7B illustrates a system 750 for configuring a SerDes based on evaluation of a probe signal (and/or a reflection thereof), in accordance with one embodiment. As an option, the system 750 may be implemented with one or more features of any one or more of the embodiments set forth in any previous and/or subsequent figure(s) and/or description thereof. However, it is to be appreciated that the system 750 may be implemented in the context of any desired environment.

As shown, detection means in the form of a detection module 752 is included for detecting at least one of a probe signal or a reflection resulting from the probe signal. The detection module 752 may include, but is not limited to the receiver 106 of FIG. 1A, the receiver 261 of FIG. 2B, and/or any other desired circuitry configured for providing the aforementioned capability. Further included is evaluation means in the form of an evaluation module 754 in communication with the detection module 752 for evaluating the probe signal and/or reflection. In various embodiments, the evaluation module 754 may include, but is not limited to the evaluation circuitry 108 of FIG. 1A, the slicer 262 of FIG. 2B, the receiver phase interpolator 297/receiver equalizer 298/slicer 292 of FIG. 2C, and/or any other desired circuitry configured for providing the aforementioned capability.

Still yet, setting means in the form of a setting module 756 is in communication with the evaluation module 754 for setting at least one configurable aspect of the system 750, based on the evaluation of the aforementioned evaluation means. In various embodiments, the evaluation module 754 may be any system component including, but not limited to the SerDes component(s) 110 of FIG. 1A, the DFE 266 of FIG. 2B, the DFE 296 of FIG. 2C, a filter, a converter, a FFE, a time recovery component, and/or any other circuitry with at least one configurable aspect.

Figure 8:
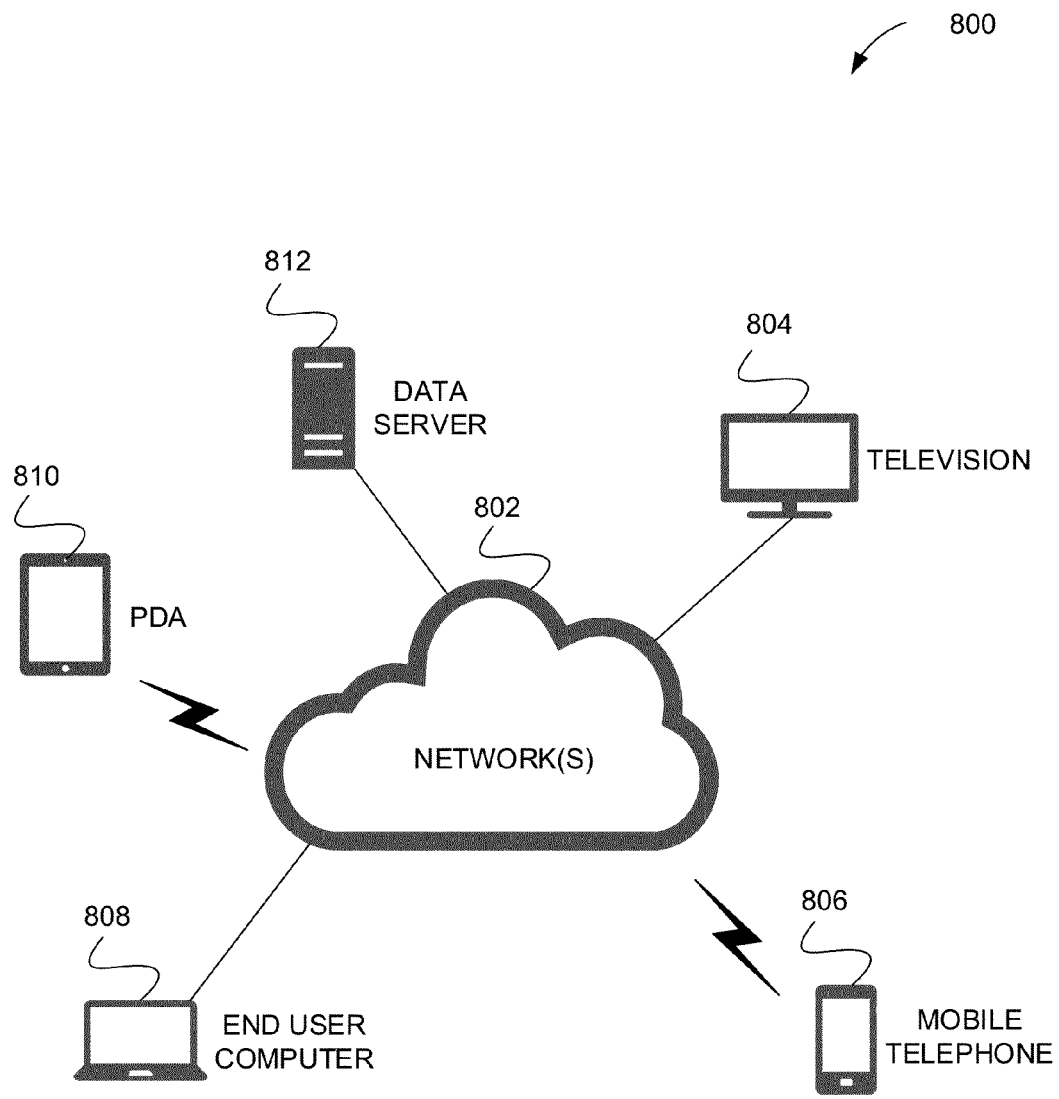
FIG. 8 illustrates a network architecture, in accordance with one embodiment.

FIG. 8 illustrates a network architecture 800, in accordance with one embodiment. In one embodiment, any one or more components of the network architecture 800 may be equipped with a SerDes (or any other features) from one or more of the embodiments described in the previous features.

As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 812 and an end user computer 808 may be coupled to the network 802 for communication purposes. Such end user computer 808 may include a desktop computer, lap-top computer, and/or any other type of logic. Still yet, various other devices may be coupled to the network 802 including a personal digital assistant (PDA) device 810, a mobile phone device 806, a television 804, etc.

Figure 9:
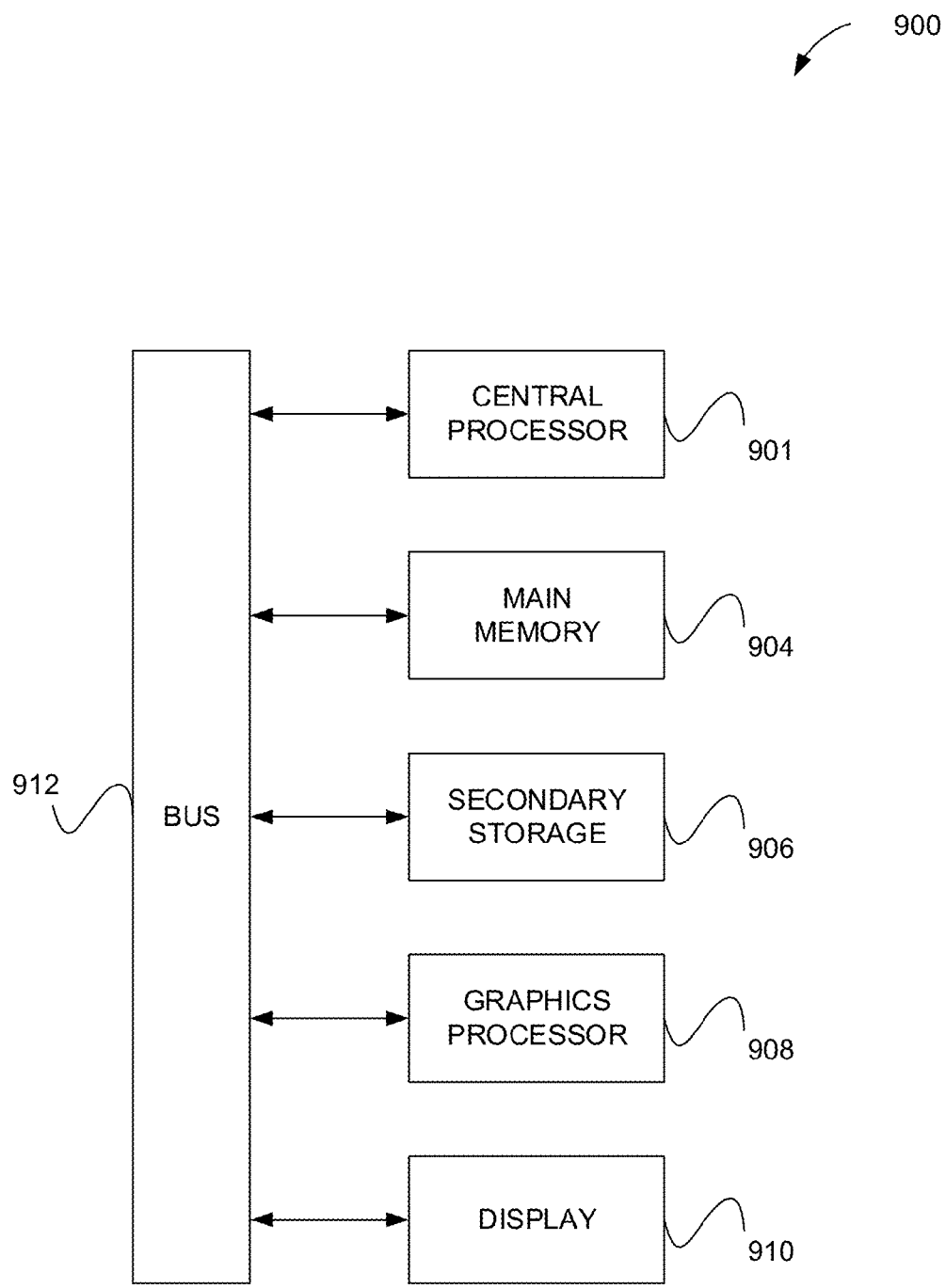
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. However, it is to be appreciated that the system 900 may be implemented in any desired environment.

As shown, a system 900 is provided including at least one central processor 902 which is connected to a bus 912. The system 900 also includes main memory 904 [e.g., hard disk drive, solid state drive, random access memory (RAM), etc.]. The system 900 also includes a graphics processor 908 and a display 910.

The system 900 may also include a secondary storage 906. The secondary storage 906 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 906, and/or any other memory, for that matter. Such computer programs, when executed, enable the system 900 to perform various functions (as set forth above, for example). Memory 904, secondary storage 906 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
a serializer/deserializer including circuitry configured to:
   detect at least one of a probe signal or a reflection resulting from the probe signal;
   evaluate at least one of the probe signal or the reflection resulting from the probe signal; and
   set at least one configurable aspect of the apparatus, based on the evaluation of at least one of the probe signal or the reflection resulting from the probe signal; and
   wherein the probe signal includes an alternative isolated pulse (AIP).

2. The apparatus of claim 1, wherein the apparatus is configured such that an integral of the probe signal equals zero (0).

3. The apparatus of claim 1, wherein the apparatus is configured such that a positive peak amplitude and a negative peak amplitude of the probe signal have at least one first magnitude that is greater than at least one second magnitude of a positive peak amplitude and a negative peak amplitude of a data signal.

4. The apparatus of claim 1, wherein the apparatus is configured such that a positive peak amplitude and a negative peak amplitude of the probe signal is repeated at least twice.

5. The apparatus of claim 1, wherein the apparatus is configured such that the at least one configurable aspect of the apparatus includes at least one configurable aspect of a receiver of the apparatus.

6. The apparatus of claim 1, wherein the apparatus is configured such that the at least one configurable aspect of the apparatus includes at least one configurable aspect of a component including at least one of a filter, a converter, a decision feedback equalizer (DFE), a feed forward equalizer (FFE), or a time recovery component.

7. The apparatus of claim 1, wherein the apparatus is configured such that the at least one of the probe signal or the reflection resulting from the probe signal, includes the probe signal.

8. The apparatus of claim 1, wherein the apparatus is configured such that the at least one of the probe signal or the reflection resulting from the probe signal, includes the reflection resulting from the probe signal.

9. The apparatus of claim 1, wherein the apparatus is configured such that the at least one of the probe signal or the reflection resulting from the probe signal, includes both the probe signal and the reflection resulting from the probe signal.

10. A method, comprising:
  detecting at least one of a probe signal or a reflection resulting from the probe signal, utilizing a serializer/deserializer;
  evaluating at least one of the probe signal or the reflection resulting from the probe signal, utilizing the serializer/deserializer; and
  setting at least one configurable aspect of the serializer/deserializer, based on the evaluation of at least one of the probe signal or the reflection resulting from the probe signal; and
  wherein the probe signal includes an alternative isolated pulse (AIP).

11. The method of claim 10, wherein the serializer/deserializer includes a first serializer/deserializer in communication with a second serializer/deserializer, and further comprising:
  transmitting, by the first serializer/deserializer, a first probe signal to the second serializer/deserializer while a transmitter of the second serializer/deserializer is muted; and
  configuring at least one aspect of a receiver of the second serializer/deserializer, based on the first probe signal.

12. The method of claim 11, and further comprising:
  transmitting, by the second serializer/deserializer, a second probe signal to the first serializer/deserializer while a transmitter of the first serializer/deserializer is muted; and
  configuring at least one aspect of a receiver of the first serializer/deserializer, based on the second probe signal.

13. The method of claim 12, and further comprising:
  detecting, by the second serializer/deserializer, a first reflection that results from the second probe signal; and
  configuring at least one aspect of a component of the second serializer/deserializer, based on the detected first reflection.

14. The method of claim 13, and further comprising:
  transmitting, by the first serializer/deserializer, a third probe signal to the second serializer/deserializer while the transmitter of the second serializer/deserializer is muted; and
  detecting, by the first serializer/deserializer, a second reflection that results from the third probe signal; and
  configuring at least one aspect of a component of the first serializer/deserializer, based on the detected second reflection.

15. A system, comprising:
  a first serializer/deserializer; and
  a second serializer/deserializer in communication with the first serializer/deserializer; and
  wherein the system is configured such that:
  the first serializer/deserializer transmits a first probe signal to the second serializer/deserializer while a transmitter of the second serializer/deserializer is muted; and
  the second serializer/deserializer configures at least one aspect of a receiver of the second serializer/deserializer, based on the first probe signal; and
  wherein the probe signal includes an alternative isolated pulse (AIP).

16. The system of claim 15, wherein the system is further configured such that:
  the second serializer/deserializer transmits a second probe signal to the first serializer/deserializer while a transmitter of the first serializer/deserializer is muted; and
  the first serializer/deserializer configures at least one aspect of a receiver of the first serializer/deserializer, based on the second probe signal.

17. The system of claim 16, wherein the system is further configured such that:
  the second serializer/deserializer detects a first reflection that results from the second probe signal; and
  the second serializer/deserializer configures at least one aspect of a component of the second serializer/deserializer, based on the detected first reflection.

18. The system of claim 17, wherein the system is further configured such that:
  the first serializer/deserializer transmits a third probe signal to the second serializer/deserializer while the transmitter of the second serializer/deserializer is muted; and
  the first serializer/deserializer detects a second reflection that results from the third probe signal; and
  the first serializer/deserializer configures at least one aspect of a component of the first serializer/deserializer, based on the detected second reflection.

* * * * *